United States Patent [19]

Lomen

[11] Patent Number: 4,591,824
[45] Date of Patent: May 27, 1986

[54] TURNING SIGNAL AND BRAKE LIGHT CONTROL APPARATUS AND METHOD

[76] Inventor: John J. Lomen, 1423 Mapleview, S.E., Kentwood, Mich. 49508

[21] Appl. No.: 711,103

[22] Filed: Mar. 13, 1985

[51] Int. Cl.[4] .............................................. B60Q 1/26
[52] U.S. Cl. ........................................ 340/74; 340/67; 340/69; 340/78; 340/56
[58] Field of Search .................. 340/74, 78, 71, 72, 340/73, 69, 67, 66, 55, 56, 815.3; 307/10 LS

[56] References Cited

U.S. PATENT DOCUMENTS

| | | | |
|---|---|---|---|
| 2,513,712 | 7/1950 | Coombs | 340/81 |
| 2,669,704 | 2/1954 | Hollins | 340/81 |
| 2,876,432 | 3/1959 | Gordon | 340/81 |
| 2,924,817 | 2/1960 | Dawkins | 340/73 |
| 2,957,161 | 10/1960 | Daws | 340/73 |
| 3,214,732 | 10/1965 | Young | 340/78 |
| 3,243,773 | 3/1966 | Leichsenring | 340/72 |
| 3,350,684 | 10/1967 | Turner | 340/67 |
| 3,460,089 | 8/1969 | Gregory | 340/67 |
| 3,659,260 | 4/1972 | St. Pierre | 340/71 |
| 4,403,210 | 9/1983 | Sullivan | 340/72 |

*Primary Examiner*—Donnie L. Crosland
*Attorney, Agent, or Firm*—Price, Heneveld, Huizenga & Cooper

[57] ABSTRACT

For a vehicle conventionally having at least a pair of laterally separated rear lights, a brake switch operated by the brake pedal of the vehicle for normally causing illumination of both lights and a turn signal switch and flasher combination for intermittently operating one of the pair of rear lights to indicate an intended direction of turning, a system for controlling the rear lights of the vehicle so that, upon actuation of the brakes of the vehicle after the turn signal switch is operated to indicate the direction of an intended turn by causing intermittent illumination of one of the rear lights, the other rear light is continuously illuminated until the turn signal switch is turned off.

10 Claims, 2 Drawing Figures

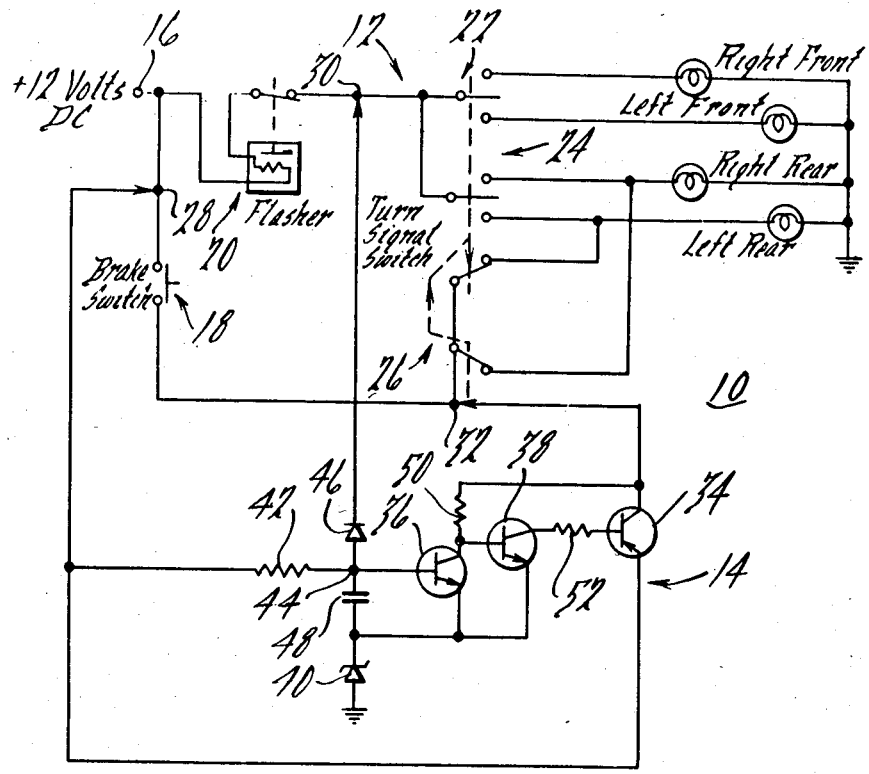
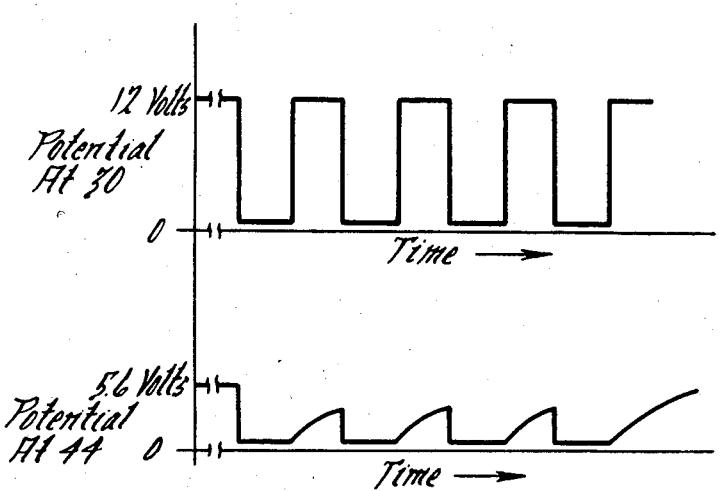

4,591,824

TURNING SIGNAL AND BRAKE LIGHT CONTROL APPARATUS AND METHOD

BACKGROUND OF THE INVENTION

When a vehicle is being operated on icy or slippery streets, it is customary for the vehicle operator to pump the brake pedal of the vehicle to prevent wheel lockup and consequent skidding. The pumping of the brake pedal causes both rear lights to blink on and off. This normally is not a problem when the vehicle is on a straight course. However, if the driver pumps the brake pedal to slow preparatory to making a turn, and simultaneously operates the turn signal switch for the vehicle to indicate such turn, for example, a left turn, the left rear light will be operated by a flasher connected to the turn switch whereas the right rear light will continue to blink in response to the brake pedal. This condition can confuse following drivers as to the intention of the operator of the instant vehicle. More particularly, the following driver will see both tail lights blinking, and often will not be able to tell whether the driver intends to turn left or right, particularly if the leading driver "swings wide" before entering the turn, which action ostensibly indicates a turn in the direction opposite of the direction of the actual impending turn. This confusion creates a dangerous condition and may result in an accident.

One solution to the aforenoted problem has been to provide a "dedicated" set of lamps, housings and the like on the rear of automobiles to be used solely as rear turn signals. The lenses are often a different color from the brake lights, such as amber. This solution, while effective, is extremely expensive.

SUMMARY OF THE INVENTION

The present invention provides a method and apparatus for avoiding the confusion which may arise from simultaneous activation of a turn signal and pumping of the brake pedal. It does so without requiring separate turn signal lamps, housings, etc. According to this invention, the operation of the turn signals and the brake pedal is interrelated so that upon a single application of the brake pedal while the turn signal switch is in the closed position to indicate either a left or right turn, the rear light not being operated by the turn signal switch is caused to be continuously illuminated. Thus, subsequent pumping of the brake pedal by the operator causes no change in the illumination condition of the signal lights at the rear of the vehicle. The following driver will see one rear light blinking indicating the direction of an intended turn, and he will also see the other tail light indicating slowing of the vehicle, or probably slowing as a result of at least one actuation of the brake pedal after the turn signal switch has been closed. Therefore, the signal pattern presented to the following driver is clear and remains consistent and, consequently, the dangers created by the confusion associated with existing signal systems are avoided. Accordingly, the present invention is believed to constitute an important safety advance in the automotive art.

BRIEF DESCRIPTION OF THE DRAWINGS

FIG. 1 is a circuit diagram of an exemplary signal light control circuit according to this invention in combination with a conventional turn signal and brake light circuit; and FIG. 2 is a pair of signal diagrams for the control circuit of FIG. 1.

DETAILED DESCRIPTION OF THE PREFERRED EMBODIMENT

In FIG. 1, a circuit 10 is shown for operating the front and rear signal lights for an automobile or other vehicle. The circuit 10 includes a conventional brake and turn signal light circuit 12 and an exemplary turn signal control circuit 14 according to this invention. Since the conventional brake and turn signal circuit 12 is well known in the art and is but one example of a circuit used for this purpose, it will only be described in brief. The circuit 12 is connected to the electric power supply for the vehicle, for example, a 12 volt DC battery or alternator, at a terminal 16. The voltage supply is connected to a conventional brake switch 18 and the switch of a flasher 20. The brake switch 18 is normally open while the switch of the flasher 20 is normally closed. The circuit 12 further includes a turn signal switch 22 having a first switch portion 24 for connecting the power supply to a selected one of the front signal lights and a corresponding one of the rear signal lights, and a switch portion 26 for disconnecting the selected one of the rear signal lights from the brake switch 18. Normally, the switch portion 26 connects both of the rear signal lights to the brake switch 18. A lost motion connection between the switch portion 24 and the switch portion 26 is provided which is effective only in the direction indicated by the arrows such that a downward motion of the arms of switch portion 24 disconnects only the left rear signal and an upward motion of the arms of the switch portion 24 disconnects only the right rear brake signal. Accordingly, selection of one of the rear lights for intermittent operation to signal a turn simultaneously disconnects the selected rear light from the brake switch.

The control circuit 14 includes a PNP transistor 34 which is connected in parallel with the brake switch 18 such that power from the DC supply may be delivered from junction 28 to junction 32 either by closing the brake switch 18 or causing transistor 34 to conduct. Conduction of the transistor 34 is controlled by NPN transistors 36 and 38 such that closing of the brake switch 18 after the turn signal switch 22 has been closed causes the rear signal opposite the light signaling the turn to remain continuously illuminated until the turn signal switch 22 is switched off.

The emitter of transistor 36 is maintained at a preselected potential above ground level, for example, 5 volts, by a zener diode 40. A resistor 42 connects a base junction 44 of the transistor 36 to the 12 volt supply to normally maintain the potential at junction 44 at a slightly greater level than the potential level maintained by the zener diode 40, for example, 5.6 volts, thereby normally holding the transistor 36 in a conducting state. The base of transistor 36 is connected to the output side of the flasher unit 20 through a diode 46. Since the switch of the flasher unit 20 is normally in the closed position and, consequently, the voltage at junction 30 is normally 12 volts, the diode 46 is ordinarily reverse biased. A capacitor 48 is connected between the terminal 44 and the emitter of the transistor 36 to provide an RC delay circuit for purposes to be explained hereinafter. The collector-emitter circuit of transistor 36 is connected across the base-emitter circuit of the transistor 38, while the base terminal of transistor 38 is connected to junction 32 through a resistor 50. Junction 32 is essentially at ground potential when the brake switch 18 is open and, accordingly, no current is available at the base of the transistor 38 to turn that transistor on when the brake switch 18 is open. Furthermore, since the transistor 36 is connected across the base-emitter circuit of transistor 38, conduction or saturation of transistor 36 maintains the transistor 38 in a nonconducting condition regardless of whether the brake switch 18 is opened or closed. The collector of the transistor 38 is connected through a current limiting resistor 52 to the base of the transistor 34 such that conduction of the transistor 38 causes conduction of the transistor 34 and nonconduction of the transistor 38 renders the transistor 34 nonconductive.

With regard to operation of the turn signal and brake system 10 of FIG. 1, it can be seen that normally the brake switch 18 is open and the turn signal switch 22 is in the open or center position as shown. Under these conditions, the transistor 36 is forward biased to maintain the transistors 38 and 34 nonconductive. Accordingly, under these conditions, the control circuit 14 has no effect on the system 10. If the brake is now activated, closing the switch 18, junction 32 will be raised to approximately 12 volts, which would ordinarily increase the potential at the base of the transistor 38 to cause conduction thereof except for the fact that the transistor 36 is in the conducting state and, accordingly, prevents conduction of the transistor 38. Correspondingly, transistor 34 remains nonconductive.

Now consider the condition where the brake switch 18 is open and the turn signal switch 22 is actuated. Upon each opening of the switch of the flasher 20, the potential at the junction 30 will drop to near ground level, as illustrated in FIG. 2, thereby forward biasing the diode 46 on each such occurrence. Accordingly, the potential at point 44 is drawn to approximately that voltage level plus the voltage drop across the diode 46. This turns the transistor 36 off. When the switch of the flasher 20 again closes such that the diode 46 again becomes reverse biased, the potential at point 44 begins to rise toward the 5.6 volt level, as shown in FIG. 2. However, the resistance value of the resistor 42 and the size of the capacitor 48 are selected so as to provide a time constant which retards the potential rise at point 44 to prevent the potential at point 44 from reaching a potential which is sufficient to turn transistor 36 on again by the time that the switch of the flasher 20 is again opened to reduce the potential at point 44, as illustrated in FIG. 2. Accordingly, the transistor 36 is maintained in an off condition. However, the transistor 38 does not conduct since junction 32 is at ground potential and, consequently, no current is available at the base of transistor 38 to turn it on.

Now consider the case where the turn signal switch 22 has been actuated or closed and the transistor 36 is maintained in a nonconductive state as explained above, and thereafter the brake switch 18 is closed. Junction 32 is raised to volts delivering base current through resistor 50 to the base of transistor 38. The current at the base of the transistor 38 turns on transistor 38 which turns on transistor 34. Once transistor 34 conducts, there is a continual supply of base current to the base of transistor 38 even if the brake switch 18 is again opened since the junction 32 is held near 12 volts by the transistor 34. Accordingly, the transistor 34 will be maintained in the conducting state. As can be seen in FIG. 1, when the transistor 34 is closed, the same effect is achieved as if the brake switch 18 were continuously closed, i.e., the rear signal light opposite the one being intermittently operated to indicate the turn is continuously activated. If the turn signal switch 22 is now turned off, the diode 46 is reverse biased and the potential at point 44 is allowed to rise again to 5.6 volts to turn on transistor 36, thereby turning off transistor 38 and transistor 34. This result is achieved regardless of whether the brake switch 18 is opened or closed when the turn signal switch 22 is opened.

Now further consider the case wherein the turn signal switch 22 is closed after the brake signal switch 18 has been closed. As explained above, the intermittent operation of the flasher switch 20 causes the transistor 36 to turn off. Consequently, transistor 38 turns on by virtue of the 12 volt supply at junction 32 delivered through the closed brake switch 18. Accordingly, transistor 34 will be turned on to continuously activate the rear signal light which is not indicating the intended turning direction.

Summarizing the above description of the operation of system 10, it will be seen that the brake switch 18 is bypassed to continuously activate the rear light which is not signaling the turn if the transistor 34 is conductive. The transistor 34 only conducts when the following two conditions are concurrent: (1) the transistor 36 is not conducting; and (2) the brake switch 18 is closed to supply base current to the transistor 38. The first condition is representative of a closed turn signal switch 22 to indicate a turn, while the second condition is representative of at least a momentary application of the brakes of the vehicle. Moreover, the transistor 34 is maintained in conduction until the turn signal switch is opened, i.e., turned off. Thus, an important operational feature of this invention is to provide an electrical circuit for a brake and turn signal system having a switch means in parallel with the brake switch which is closed in response to two concurrent selected events, i.e., operation of the turn signal switch and brake signal switch at overlapping times and, moreover, which is sustained in the closed position until the turn signal switch is opened.

An alternative, although not preferred, embodiment of this invention includes a delay circuit (not shown) which will turn off transistor 34 after a predetermined time period. With such a delay circuit, the brake light on a vehicle in which the turn signal has been inadvertently left on will become operable after a predetermined period of time and will again flash to a steady-state on condition when the brakes are reactivated.

In view of the above description of the present invention, it will not be appreciated that a method and apparatus are provided for operating the rear signal lights in a manner to avoid any confusion consequent the concurrent activation of a turn signal and pumping of the brakes of a vehicle. Therefore, the present invention is believed to constitute an important safety advance in the automotive art.

While it will be apparent that the teachings herein are well calculated to teach one skilled in the art the method of making the preferred embodiment of the invention, it will be appreciated that the invention is susceptible to modification, variation and change without departing from the proper scope or meaning of the subjoined claims.

I claim:

1. An apparatus for a vehicle having actuatable brakes and a pair of signal lamps comprising:

brake switch means being operable to normally activate both of said signal lamps to indicate actuation of the brakes of said vehicle;

turn signal switch means being operable to intermittently activate only one of said pair of said signal lamps to indicate an intended direction of turning of said vehicle; and control means for continuously activating the other of said pair of said signal lamps upon concurrent operation of said brake switch means and said turn signal switch means despite subsequent cessation of operation of said brake switch means until cessation of operation of said turn signal switch means.

2. An apparatus for a vehicle according to claim 1 wherein said control means includes switch means connected in parallel with said brake switch means.

3. An apparatus for a vehicle according to claim 2 further including means for disconnecting the other of said signal lamps from said brake switch means upon operation of said turn signal switch means.

4. An apparatus for a vehicle according to claim 3 wherein said switch means of said control means is closed in response to the concurrence of a pair of conditions, a first of said conditions being operation of said turn signal switch means and a second of said conditions being operation of said brake signal switch means.

5. An apparatus for a vehicle according to claim 4 wherein said switch means of said control means is a solid state drive.

6. An apparatus for a vehicle according to claim 5 wherein said switch means of said control means is a transistor.

7. An apparatus for a vehicle according to claim 6 wherein said signal lamps are laterally disposed at the rear of said vehicle.

8. An apparatus for a vehicle having actuatable brakes and a pair of signal lamps comprising:

turn signal switch means being operable to activate only one of said pair of signal lamps to indicate intended direction of turning said vehicle;

means for continuously operating the other of said pair of signal lamps for a predetermined period upon concurrence of actuation of said brakes and operation of said turn signal switch means despite deactivation of said brakes during said predetermined period.

9. An apparatus for a vehicle according to claim 8 wherein said period extends until cessation of operation of said turn signal switch means.

10. In an apparatus for a vehicle including a pair of rear signal lamps laterally disposed at the rear of said vehicle, a source of electrical power, a brake switch being adapted to connect said source to both of said pair of rear signal lamps, upon closing thereof to illuminate both of said rear signal lamps, a flasher unit, a turn signal switch, said flasher unit and said turn signal switch being adapted to intermittently connect said source of electrical power to a selected one of said rear signal lamps for intermittent illumination thereof upon closing of said turn signal switch, said turn signal switch also being adapted to disconnect the selected rear signal lamp from said brake switch upon closing thereof, the improvement comprising:

control means being adapted to connect said source of power to said nonselected rear signal lamp in response to the concurrent closing of said brake switch and said turn signal switch and to maintain thereafter the connection between said source and said nonselected rear signal lamp despite opening of said brake switch, said control means being adapted to disconnect said source from said nonselected rear signal lamp upon opening of said turn signal switch.

* * * * *

UNITED STATES PATENT AND TRADEMARK OFFICE
CERTIFICATE OF CORRECTION

PATENT NO. : 4,591,824
DATED : May 27, 1986
INVENTOR(S) : JOHN J. LOMEN

It is certified that error appears in the above-identified patent and that said Letters Patent is hereby corrected as shown below:

Column 3, line 58:

After "to" insert -- 12 --;

Column 4, line 52:

"not" should be -- now --.

Signed and Sealed this

Eighteenth Day of November, 1986

Attest:

DONALD J. QUIGG

Attesting Officer          Commissioner of Patents and Trademarks